(12) United States Patent
Boeke

(10) Patent No.: US 8,355,268 B2
(45) Date of Patent: Jan. 15, 2013

(54) ELECTRONIC DRIVER CIRCUIT AND METHOD

(75) Inventor: Ulrich Boeke, Langerwehe (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 358 days.

(21) Appl. No.: 12/863,991

(22) PCT Filed: Jan. 26, 2009

(86) PCT No.: PCT/IB2009/050299
§ 371 (c)(1),
(2), (4) Date: Jul. 22, 2010

(87) PCT Pub. No.: WO2009/095836
PCT Pub. Date: Aug. 6, 2009

(65) Prior Publication Data
US 2010/0296324 A1 Nov. 25, 2010

(30) Foreign Application Priority Data
Jan. 29, 2008 (EP) .................................... 08101059

(51) Int. Cl.
*H02J 1/10* (2006.01)
(52) U.S. Cl. ................ 363/65; 363/89; 363/90
(58) Field of Classification Search ............ 363/65, 363/66, 67, 68, 69, 70, 88, 89, 90, 125, 126, 363/127; 323/222, 282
See application file for complete search history.

(56) References Cited

U.S. PATENT DOCUMENTS
6,320,772 B1 * 11/2001 Doyama et al. ................ 363/89
(Continued)

FOREIGN PATENT DOCUMENTS
EP 1211791 A1 6/2002
(Continued)

OTHER PUBLICATIONS
Vazquez et al: "Analysis and Experimental Study of the Buck, Boost and Buck-Boost Inverters"; 30th Annual IEEE Power Electronics Specialists Conference, 1999, vol. 2, pp. 801-806.
(Continued)

*Primary Examiner* — Nguyen Tran
(74) *Attorney, Agent, or Firm* — Mark L. Beloborodov

(57) ABSTRACT

The present invention relates to an electronic driver circuit and a corresponding method for supplying an electronic load (LED1, LED2, . . . , LEDn) with a DC current or voltage (Vload). To achieve a high efficiency and a low thermal stress on the electronic load, the proposed driver circuit comprises: —an AC input (L, N) for receiving an AC input voltage ($V_{mains}$), two buck-boost converters (10, 20) for alternately operating as rectifier for rectifying said AC input voltage ($V_{mains}$) and as DC/DC converter for DC conversion of said rectified AC input voltage, a control unit (11, 12, 13, 21, 22, 23; 40) for monitoring the zero crossing of the AC input voltage ($V_{mains}$) and for controlling said two buck-boost converters (10, 20) to change their modes of operation upon detection of a zero crossing, such that during all periods one buck-boost converter operates as rectifier and the other buck-boost converter operates as DC/DC converter.

11 Claims, 14 Drawing Sheets

U.S. PATENT DOCUMENTS

| | | | |
|---|---|---|---|
| 7,333,348 B2 * | 2/2008 | Horiuchi et al. | 363/16 |
| 7,518,895 B2 * | 4/2009 | Shekhawat et al. | 363/89 |
| 2006/0198172 A1 * | 9/2006 | Wood | 363/89 |
| 2007/0058402 A1 | 3/2007 | Shekhawat et al. | |

FOREIGN PATENT DOCUMENTS

| | | | |
|---|---|---|---|
| WO | 0157997 A1 | 8/2001 | |

OTHER PUBLICATIONS

Zhou et al: "Industry's First 4-Switch Buck-Boost Controller Achieves Highest Efficiency Using a Single Inductor-Design Note 369"; Internet Article, May 2005, Retrieved From :http://cds/LINEAR.com/docs/Design%20Note/dn369f.pdf>, Retrieved on Jul. 6, 2009, 2 Page Document.

* cited by examiner

ELECTRONIC DRIVER CIRCUIT AND METHOD

FIELD OF THE INVENTION

The present invention relates to an electronic driver circuit and a corresponding method of supplying an electronic load, in particular a number of LEDs or OLEDs coupled in series, with a DC current or voltage.

BACKGROUND OF THE INVENTION

LED lamps and luminaries are more and more penetrating the classical market segment of fluorescent and TL-Lamp applications.

Known LED driver circuits include two or three individual power converters to operate LEDs with a DC current from AC mains grid. Thus, they have a high component count and moderate efficiency of about 80%. Applications with a power level above 25 W usually include a second DC/DC boost converter to fulfill AC mains current harmonic standards, thus further increasing component count.

A low component count and high efficiency is also of interest for the inverse transfer of power, for instance the transfer of a DC current from solar cells into an AC grid. A dual buck-boost DC/AC inverter is known from N. Vazquez et al., "Analysis and experimental study of the buck, boost and buck-boost inverters", Proceedings of the IEEE Power Electronics Specialist Conference, 1999, pp. 801-806. However, this circuit has disadvantages due to its control principle. In particular, the two modulated DC voltages have a high peak value and there is a high internal power flow leading to a low efficiency.

The principle operation of a single buck-boost DC/DC converter is known from Mohan, Underland, Robins, "Power Electronics: Converters, Applications and Design", John Wiley & Sons, ISBN 0-471-50537-4, 1989. A 60 W buck-boost DC/DC converter with an efficiency of up to 98% is disclosed in W. Zhou, T. Philips, "Industry's First 4-Switch Buck-Boost Controller Achieves Highest Efficiency Using a Single Inductor", Linear Technology Corporation, Design Note 369, 2005.

US 2007/0058402 A1 discloses a synchronous full bridge rectifier which is controlled to provide a power factor near unity. The full bridge rectifiers are transistors, each with a controlling input. The AC input signal and currents within the circuit are sensed and sent to a controller. In response, the controller outputs control signals to turn on/off the rectifying MOSFETs timely to form a power factor of near one with respect to the AC input signal. The full wave rectifier is made of N-channel MOSFETs, some with fast body diodes. The MOSFETs are rectifiers and power factor circuit (PFC) control elements. The result is a one-stage synchronous rectifier with PFC. A solid state precision analogue differential amplifier senses the AC line waveform and high frequency current transformers sense the currents. The controller accepts the inputs of the amplifier and the sensed currents and outputs control signals that turn on and off the four MOSFETs. The timing of turning on/off is arranged so that the current drawn from the AC source is sinusoidal and matches the phase of the sinusoidal AC source. This special boost converter circuit generates a DC output voltage that is higher than the input voltage. For supplying a number of LEDs or OLEDs coupled in series, this circuit is not suited, however, since LEDs and OLEDs have a limited DC supply bus voltage. High DC bus voltages generate high electric fields in some series-connected LEDs or OLEDs that can damage these devices.

SUMMARY OF THE INVENTION

It is an object of the present invention to provide an electronic driver circuit and a corresponding method for supplying an electronic load, in particular a number of LEDs or OLEDs coupled in series, with a DC current or voltage, to achieve a high efficiency and exert a low thermal stress on the electronic load.

In a first aspect of the present invention, there is provided an electronic driver circuit comprising:
  an AC input for receiving an AC input voltage,
  two buck-boost converters for alternately operating as rectifier for rectifying said AC input voltage and as DC/DC converter for DC conversion of said rectified AC input voltage,
  a control unit for monitoring the zero crossing of the AC input voltage and for controlling said two buck-boost converters to change their modes of operation upon detection of a zero crossing, such that during all periods one buck-boost converter is operating as rectifier and the other buck-boost converter is operating as DC/DC converter.

In a second aspect of the present invention, there is provided an electronic driving method comprising the steps of:
  receiving an AC input voltage,
  rectifying said AC input voltage by a first of two buck-boost converters,
  DC converting said rectified AC input voltage by the second of said two buck-boost converters,
  monitoring the zero crossing of the AC input voltage, and
  controlling said two buck-boost converters to change their modes of operation upon detection of a zero crossing, such that during all periods one buck-boost converter is operating as rectifier and the other buck-boost converter is operating as DC/DC converter.

The present invention is based on the idea to operate two buck-boost converters according to a dedicated dual-mode principle. This allows the integration of two functions, namely AC/DC rectification and DC/DC conversion in a single power converter. These two functions are alternately operated by the two buck-boost converters.

The circuit and method according to the present invention offer a very high efficiency since power loss sources, like in e.g. a mains rectifier diode bridge, are not present. In particular, a higher efficiency than with known dual buck-boost converters is obtained because of greatly reduced or no internal power flow. Further, a higher efficiency than with known LED lamp drivers is obtained because of the absence of mains rectifier diodes. Still further, according to the present invention only a low thermal stress is exerted on the electronic load, e.g. LED or OLED lighting systems, from an integrated electronic driver.

Preferred embodiments of the electronic driver circuit are defined in the dependent claims. It will be understood that the electronic driving method has similar and/or identical preferred embodiments.

According to a preferred embodiment, the control unit is adapted for monitoring the sign of said AC input voltage. This provides a simple way of monitoring the zero crossings of the AC input voltage.

According to a further embodiment, the two buck-boost converters are adapted for alternately operating as synchronous rectifier, which leads to a further increase in efficiency.

Still further, it is proposed that the two buck-boost converters are adapted for alternately operating as buck-boost converter.

In a practical implementation it is proposed that at least one of said two buck-boost converters, preferably both buck-boost converters, comprises a power semiconductor, in particular a MOSFET transistor, a rectifier diode and a converter inductor. This is a simple implementation of such a buck-boost converter, requiring only a small number of electronic components.

In another practical implementation it is proposed that at least one of said two buck-boost converters, preferably both buck-boost converters, comprises a first power semiconductor, in particular a first MOSFET transistor, a second power semiconductor, in particular a second MOSFET transistor, and a converter inductor. Thus, a second power semiconductor is used as a synchronous rectifier instead of a rectifier diode, thereby reducing power losses and increasing efficiency.

It is further advantageous that at least one of said two buck-boost converters, preferably both buck-boost converters, comprises a filtering capacitor for filtering the input current of said buck-boost converter.

The control unit comprises, in one embodiment, a single control sub-unit for monitoring the zero crossing of the AC input voltage and controlling the respective buck-boost converter to change its mode of operation upon detection of a zero crossing. In an alternative embodiment, however, it is proposed that the control unit comprises two control sub-units, each being included in one of said two buck-boost converters for independently monitoring the zero crossing of the AC input voltage and controlling the respective buck-boost converter to change its mode of operation upon detection of a zero crossing.

According to a preferred embodiment, said control unit has an internal DC reference voltage and two comparators for turning on one power semiconductor as the power semiconductor of a buck-boost converter with a regulated output and the second power semiconductor as a synchronous rectifier. Hereby the significant power losses of AC mains rectifier diodes are avoided and the thermal stress in an electronic driver circuit is reduced.

According to a further embodiment, the electronic driver circuit further comprises a control loop for controlling the DC voltage supplied to said load, said control loop comprising:
  two control unit terminals for monitoring said DC voltage,
  an internal DC reference voltage,
  an error amplifier for comparing said monitored DC voltage and said DC reference voltage, and
  a pulse width modulator for generating and providing pulses to one of the two power semiconductors for generating a regulated output voltage.

Hereby the load is supplied with a stabilized DC voltage controlled by control units that are allowed to have different electrical reference potentials for the DC input voltage (control unit terminal a) and the regulated DC output voltage (control unit terminal b).

In a preferred embodiment, said control unit comprises a first control loop for controlling the DC voltage supplied to said electronic load and a second control loop for controlling the peak current in the buck-boost inductor, said control loops comprising:
  two input terminals,
  a differential amplifier for measuring the voltage at the electronic load,
  a monitoring unit for monitoring the peak current in said two buck-boost converters, and
  a processing unit for comparing said monitored DC voltage with a second internal reference voltage, wherein the output signal of said differential amplifier is multiplied with the rectified mains voltage signal at a control input to generate a reference signal for a current control loop that regulates the peak current in the inductors of the buck-boost converters.

Thus, the load is supplied with a stabilized DC average current in combination with an AC mains current that has a high power factor, and both are controlled by control units that are allowed to have different electrical reference potentials for the DC input voltage (control unit terminal a) and the regulated DC output voltage (control unit terminal b).

In a still further embodiment, said control unit comprises a control loop for controlling the DC current supplied to said electronic load, plus a second control loop that controls the peak current in the buck-boost inductors, said control loop comprising:
  a first monitoring unit for monitoring the DC current at said electronic load,
  a second monitoring unit for monitoring the peak current in said two buck-boost converters, and
  a processing unit for comparing said monitored DC current with a second internal reference voltage, wherein the output signal of that error amplifier is multiplied with the rectified mains voltage signal at control input b to generate a reference signal for a current control loop that regulates the peak current in inductors of the buck-boost converters.

This offers the advantage of operation of the buck-boost converters in the known boundary conduction mode that results in minimum peak energy storage in a buck-boost inductor and thus minimum size of the inductor.

Preferably, said first and second monitoring units comprise shunt resistors.

While the invention can be used to supply a DC current or DC voltage to any electronic load, it is preferred that said electronic driver circuit is adapted for supplying a number of LEDs and/or OLEDs with a DC current or DC voltage. Further, the electronic driver circuit generates an AC mains current with a high power factor close to one.

BRIEF DESCRIPTION OF THE DRAWINGS

The invention will now be explained in more detail with reference to the drawings in which.

DETAILED DESCRIPTION OF EMBODIMENTS

Figure 1:
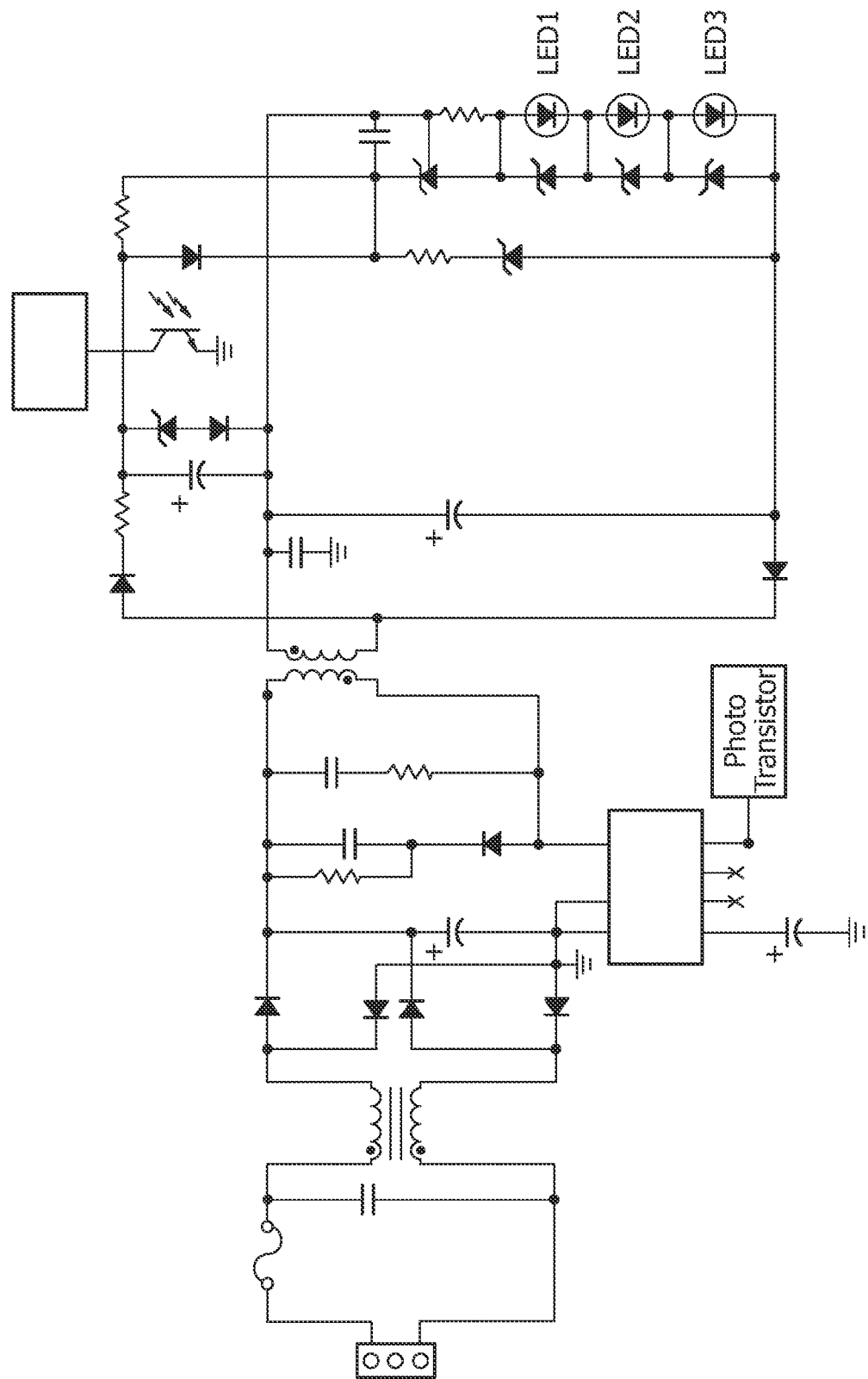
FIG. 1 shows a known LED driver circuit.

FIG. 1 depicts a driver circuit that consists of an AC/DC mains rectifier as first conversion stage and a DC/DC flyback converter as second power conversion stage. This driver circuit supplies a series of LEDs, i.e. LED1, LED2, LED3, with a DC current from AC mains grid. It has, however, a high component count and a moderate efficiency of about 80%.

Figure 3:
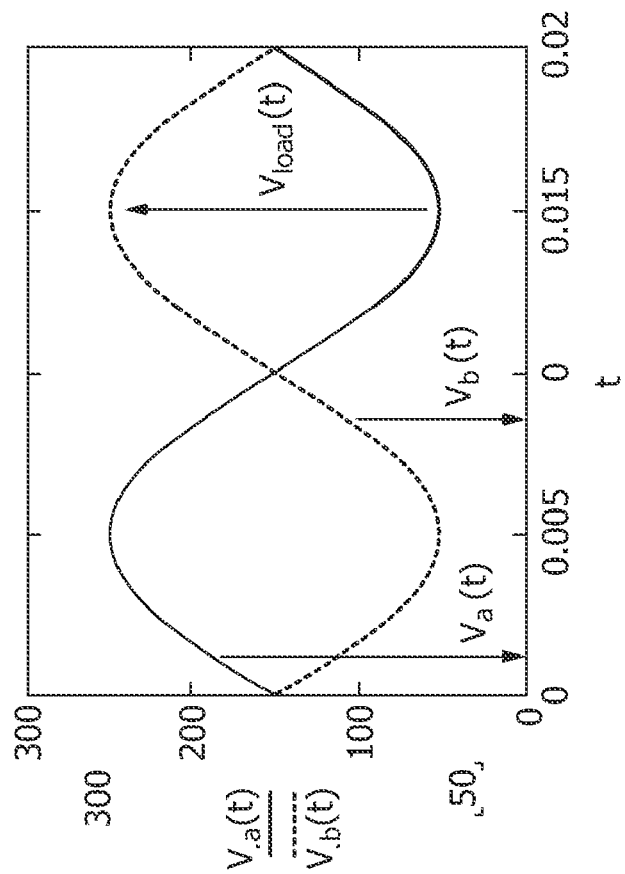
FIG. 3 shows the AC output voltage of the known buck-boost inverter shown in FIG. 2.
Figure 2:
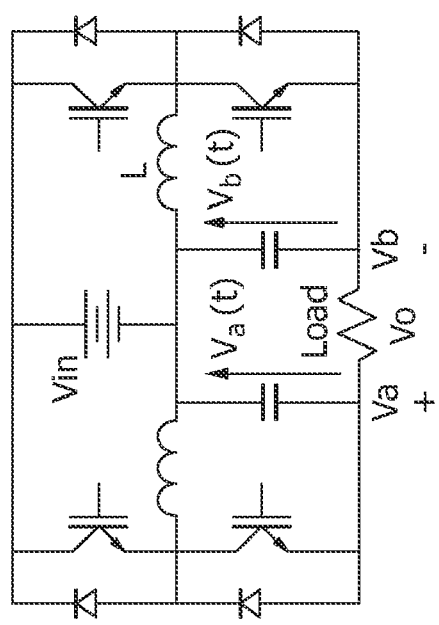
FIG. 2 shows a known buck-boost inverter.
Figure 4:
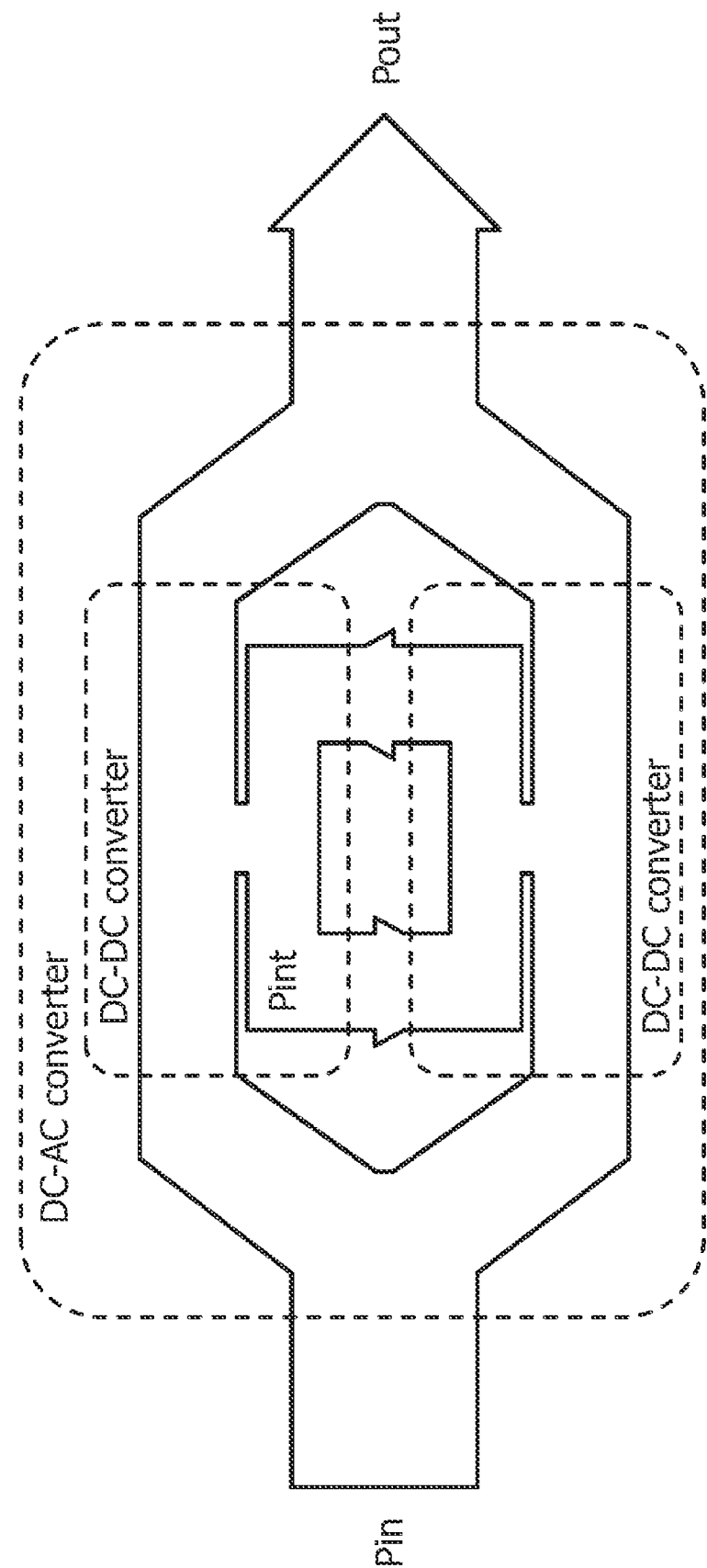
FIG. 4 shows the internal power flow of the known buck-boost inverter shown in FIG. 2.

FIG. 2 depicts a circuit diagram of a dual buck-boost DC/AC inverter known from N. Vazquez et al., "Analysis and experimental study of the buck, boost and buck-boost inverters", Proceedings of the IEEE Power Electronics Specialist Conference, 1999, pp. 801-806. This circuit, however, has disadvantages. Firstly, it generates two modulated DC voltages $V_a(t)$ and $V_b(t)$ that have a high peak value in excess of two times the peak output AC voltage as illustrated in FIG. 3. Secondly, the multiplication of load current times modulated DC voltages $V_a(t)$ and $V_b(t)$ leads to an internal power flow as illustrated in FIG. 4. This internal power flow increases conduction loss and thus the combination of this converter circuit with the proposed control technique does not result in high efficiency.

Figure 5:
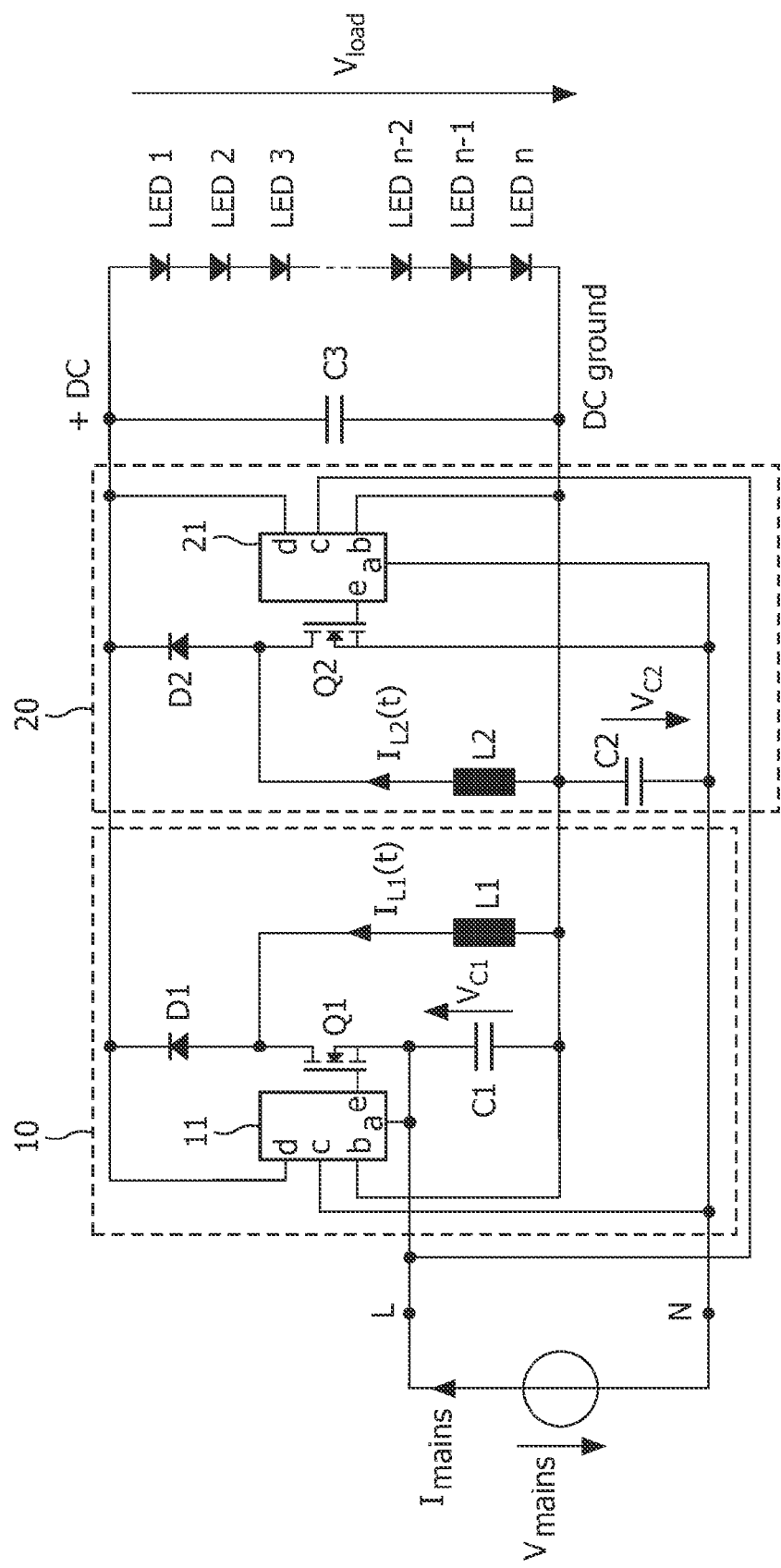
FIG. 5 shows a circuit diagram of a first embodiment of an electronic driver circuit according to the present invention.

A circuit diagram of a first embodiment of an electronic driver circuit according to the present invention is depicted in FIG. 5. The electronic driver circuit operates as a combined AC/DC and DC/DC converter and converts AC mains voltage $V_{mains}$ to a regulated DC voltage $V_{load}$ to supply an electronic load, here a number of LEDs: LED1, LED2, . . . , LEDn coupled in series, said driver circuit having a low component count and thus low cost as well as a high efficiency.

The electronic driver circuit comprises two buck-boost converters 10, 20, each comprising control sub-units 11, 21, a power semiconductor Q1, Q2 (here a MOSFET transistor Q1, Q2), a rectifier diode D1, D2 coupled with one terminal to the drain terminal of the respective MOSFET transistor Q1, Q2 and with the other terminal to the +DC output terminal, and an inductor L1, L2 coupled between the drain terminal of the respective MOSFET transistor Q1, Q2 and the DC ground output terminal.

The control sub-units 11, 21 (depicted in more detail in FIG. 14) have five control terminals a, b, c, d and e. The control terminal a of control sub-unit 11 is coupled to the source terminal of MOSFET transistor Q1 and AC mains line terminal L. The control terminal a of control sub-unit 21 is coupled to the source terminal of MOSFET transistor Q2 and AC mains neutral terminal N.

The control terminal b of both control sub-units is coupled to the DC ground output terminal. The control terminal c of control sub-unit 11 is coupled to AC mains neutral terminal N. The control terminal c of control sub-unit 21 is coupled to AC mains line terminal L.

Control terminals d of both control sub-units are coupled to the +DC output terminal. An output filtering capacitor C3 is coupled between the DC output terminals.

Input capacitors C1, C2 are coupled between the DC ground output terminal and the source terminal of the respective MOSFET transistor Q1, Q2 for filtering the input current of the respective buck-boost converter 10, 20.

Figure 6:
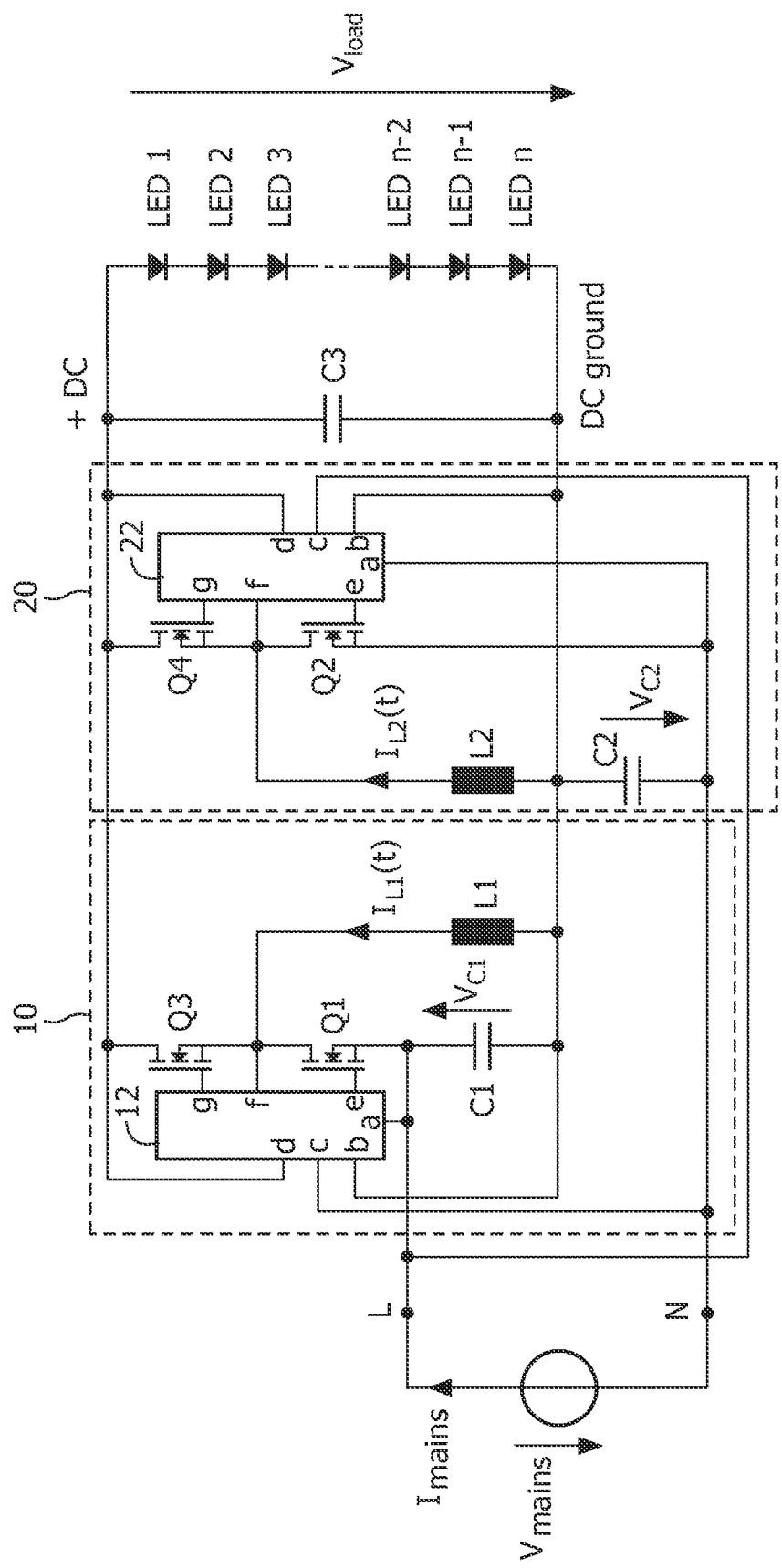
FIG. 6 shows a circuit diagram of a second embodiment of an electronic driver circuit according to the present invention.
Figure 15:
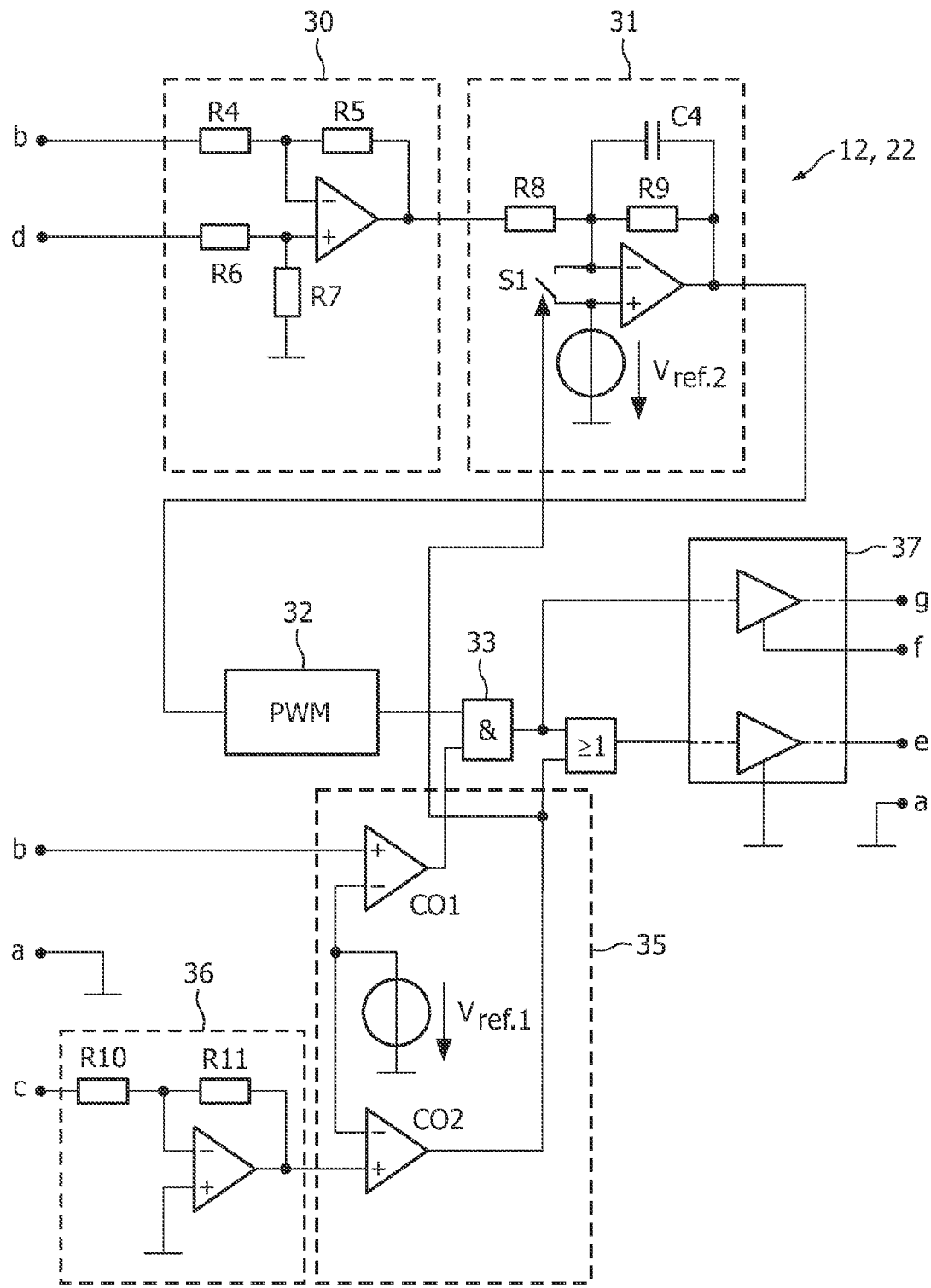
FIG. 15 shows a circuit diagram of a second embodiment of control units.

Conduction loss of buck-boost rectifier diodes D1 and D2 can be reduced by realizing synchronous rectification with power semiconductors Q3, Q4 (here MOSFET transistors Q3, Q4, the source terminal of each of which is coupled to the drain terminal of the respective MOSFET transistor Q1, Q2), as depicted in FIG. 6 showing a circuit diagram of a second embodiment of the electronic driver circuit according to the present invention. The two control sub-units 12 and 22 (depicted in more detail in FIG. 15) require a slightly increased effort (half-bridge driver 37 rather than amplifier 34) and have two further control terminals f and g. The control terminal f is coupled to the drain terminal of the respective MOSFET transistor Q1, Q2 and the control terminal g is coupled to the gate terminal of the respective MOSFET transistor Q3, Q4.

The circuits operate principally as follows. One of the two buck-boost converters 10, 20 operates as a synchronous mains rectifier and the other buck-boost converter operates as a buck-boost DC/DC converter. These two functions change after every zero crossing of the AC mains voltage $V_{mains}(t)$. Thus, the circuit detects the sign of the AC mains voltage, for which purpose—in these embodiments—control sub-units 11, 21 have control inputs a, b and c monitoring that.

Figure 7:
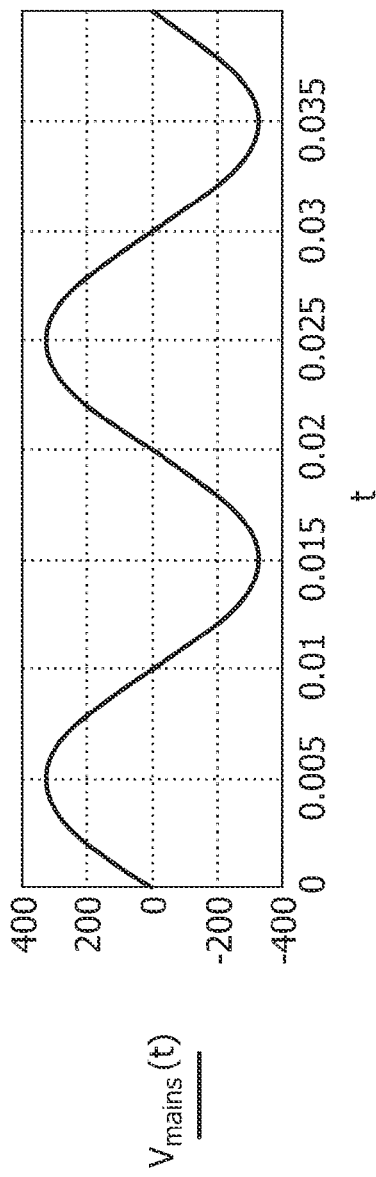
FIG. 7 shows a time function of the AC mains voltage for two mains periods.

For a more detailed explanation of the present invention, a sinusoidal AC mains voltage $V_{mains}$ having a frequency of e.g. 50 Hz as depicted in FIG. 7 will be considered. The AC mains voltage $V_{mains}$ is positive in the first half of the mains period (0<t<10 ms) and negative in the second period (10 ms<t<20 ms).

The following description considers the part of the mains period 0<t<10 ms with a positive AC mains voltage $V_{mains}(t)$> 0. In this time period, the inverse diode of MOSFET transistor Q1 rectifies AC mains voltage $V_{mains}(t)$ and thus the following applies:

$$V_{C2}(t)=V_{mains}(t).$$

Figure 14:
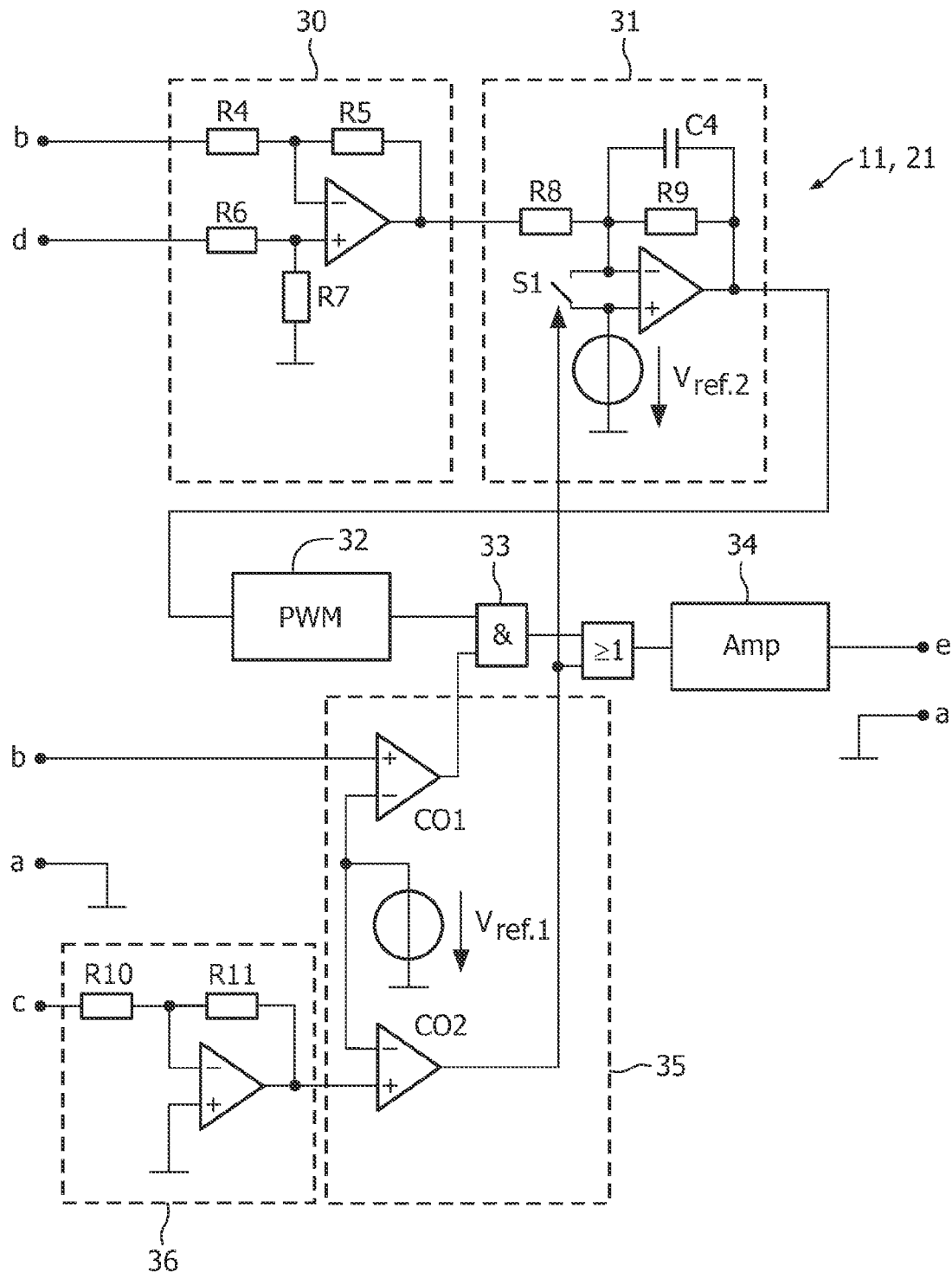
FIG. 14 shows a circuit diagram of a first embodiment of control units.

Control sub-unit 11, as shown in FIG. 14, comprises a differential amplifier 30, a PI-type error amplifier 31, a pulse width modulator 32, an AND gate 33, an amplifier 34, a comparator and reference voltage unit 35 and an inverter 36. The control sub-unit 11 measures a small voltage between terminals b and a.

$$V_{ba}(t)=V_{C1}(t)=I_{mains}(t)*j2\pi f_{mains}L_1+V_{SD}(Q1)$$

Control sub-unit 11 measures further a negative voltage between terminals c and a.

$$V_{ca}(t)=-V_{C2}(t)=-V_{mains}(t)$$

Figure 10:
FIG. 10 shows a time function of the gate-source voltage of power semiconductor Q1.

Voltage $-V_{ca}(t)$ is compared with a DC reference voltage, e.g. $V_{ref.1}$=2 V, integrated in both control sub-units 11, 21 by means of comparator CO2. This comparator generates a logic high signal if the negative voltage $-V_{ca}(t)$ becomes larger than $V_{ref.1}$. This signal generates a voltage at terminal e of control sub-unit 11 that turns on MOSFET Q1 with a gate signal that is depicted in FIG. 10. The turning-on of MOSFET transistor Q1 reduces the conduction loss in that device. At the end of the AC mains voltage half-wave, the negative voltage $-V_{ca}(t)$ becomes smaller than $V_{ref.1}$ and thus turns-off MOSFET transistor Q1. Furthermore, the output signal of comparator CO2 closes a switch Si that short-circuits the input of the error amplifier 31. Thus, the voltage control loop of control sub-unit 11 is not active in this time interval.

Control sub-unit 21 measures a positive voltage between terminals b and a in that first half-wave of the AC mains period.

$$V_{ba}(t)=V_{C2}(t)=V_{mains}(t)$$

Voltage $V_{ba}(t)$ is also compared with a DC reference voltage, e.g. $V_{ref.1}=2$ V, by means of comparator CO1 in control sub-units 11 and 21 depicted in FIG. 14. This comparator CO1 generates a logic high signal if the voltage $V_{ba}(t)$ becomes larger than $V_{ref.1}$. As soon as $V_{ba}(t)$ is above internal DC reference voltage $V_{ref1}$, the control sub-unit 21 changes to the second operation mode to generate a regulated DC output voltage.

Figure 11:
FIG. 11 shows a time function of the gate-source voltage of power semiconductor Q2.
Figure 13:
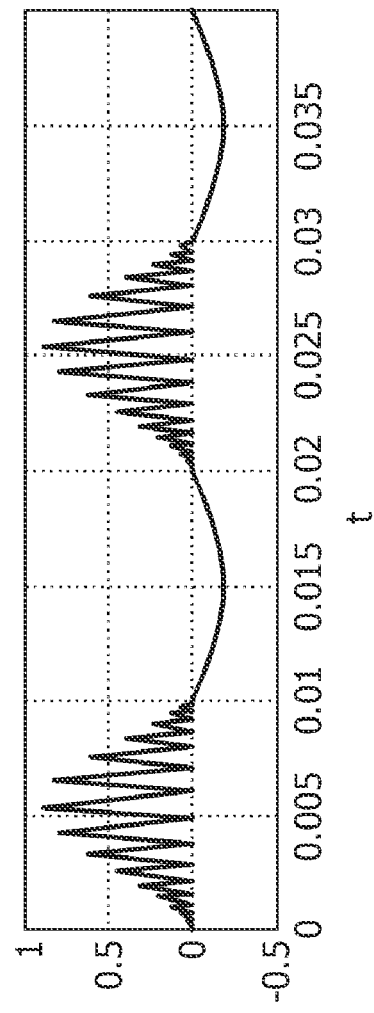
FIG. 13 shows a time function for inductor current $I_{L2}(t)$.

Control sub-unit 21 generates gate signals at its terminal e depicted in FIG. 11, that are conducted to MOSFET Q2 to operate buck-boost converter circuit 20 as a DC/DC converter. Current $I_{L2}(t)$ ramps-up as depicted in FIG. 13. Once MOSFET transistor Q2 is turned off, the current commutates from MOSFET transistor Q2 into rectifier diode D2 (in the embodiment shown in FIG. 5), or synchronous rectifier switch Q4 (in the embodiment shown in FIG. 6) to transfer the energy stored in inductor L2 into the output filter capacitor C3. Terminal d of control sub-unit 21 is used to measure output voltage $V_{load}$ as feedback signal for a voltage control loop that regulates the output voltage.

Figure 9:
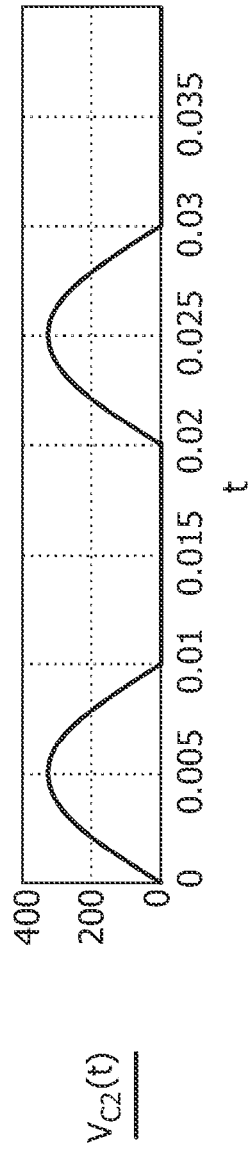
FIG. 9 shows a time function of capacitor C2 voltage for two mains periods.

At the end of the half mains period, $V_{ba}(t)=V_{C2}(t)$ (shown in FIG. 9) drops below internal reference voltage level $V_{ref1}$. Comparator CO1 sends a logic low signal to a logic AND function A that turns-off the pulse-width modulated gate signals at output e of control sub-unit 21.

After the zero crossing of the AC mains voltage $V_{mains}(t)$ at t=10 ms (shown in FIG. 7), both buck-boost converters 10, 20 change functions. At the beginning of the time interval 10 ms<t<20 ms, the inverse diode of MOSFET transistor Q2 becomes conductive and operates as mains rectifier diode. It now follows that:

$$V_{C1}(t)=-V_{mains}(t).$$

$$V_{C2}(t)=-I_{mains}(t)*j2\pi f_{mains}L_2+V_{SD}(Q2).$$

Figure 8:
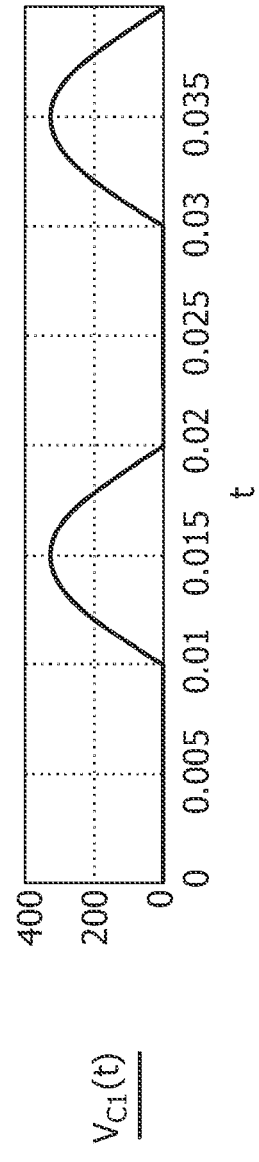
FIG. 8 shows a time function of capacitor C1 voltage for two mains periods.
Figure 12:
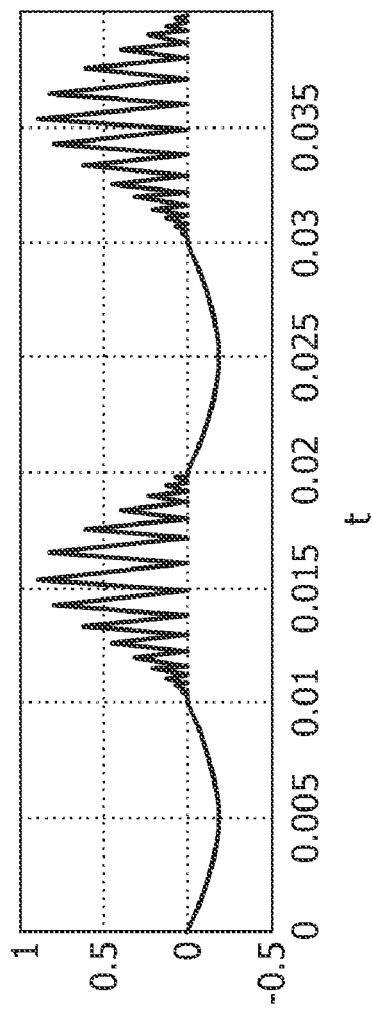
FIG. 12 shows a time function for inductor current $I_{L1}(t)$.

As soon as the terminal voltage $V_{ba}(t)=V_{C1}(t)$ (shown in FIG. 8) of control sub-units 11 is above internal reference voltage $V_{ref1}$, buck-boost converter 10 starts its operation to generate a regulated DC output voltage. Current $I_{L1}(t)$ is depicted in FIG. 12. At the same time, control sub-unit 21 detects a negative voltage $V_{ca}(t)=-V_{C1}(t)$ that turns-on MOSFET transistor Q2 as a synchronous rectifier to reduce conduction loss.

By using the inverse diodes of the MOSFET transistors Q1 and Q2 or by operating one of the two MOSFET transistors Q1 or Q2 as a synchronous mains current rectifier, the maximum voltage on both capacitors C1 and C2 is the mains voltage amplitude that is more than two times lower than in the known embodiment shown above in FIG. 2. Hence, the component voltage stress and internal power flow is greatly reduced compared with the control principle applied in this known embodiment.

Figure 16:
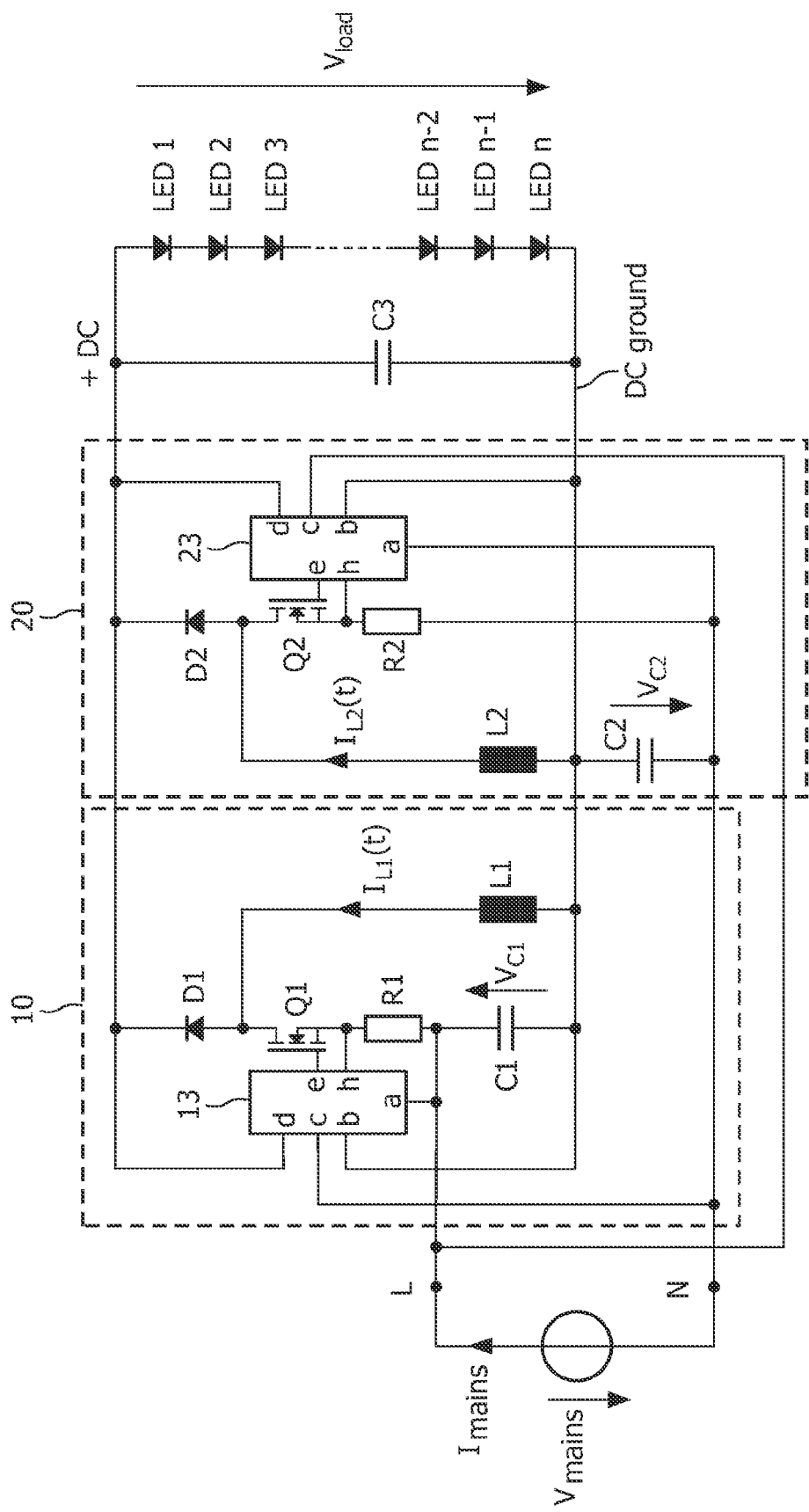
FIG. 16 shows a circuit diagram of a third embodiment of an electronic driver circuit according to the present invention.
Figure 17:
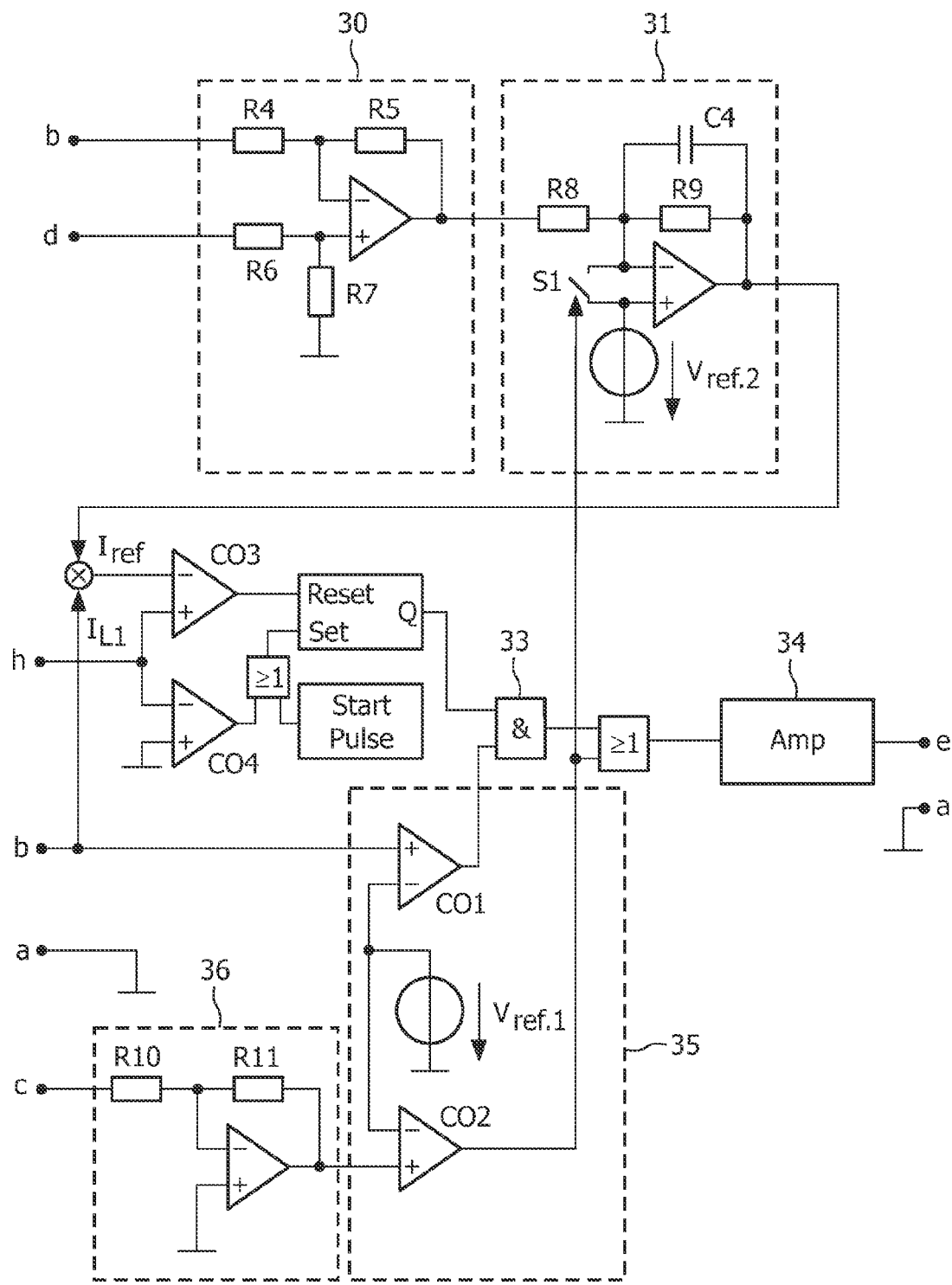
FIG. 17 shows a circuit diagram of a third embodiment of control units.

The circuits depicted in FIGS. 5 and 6 generate a regulated DC output voltage by means of a voltage control loop. The stability of this voltage control loop can be improved by adding a peak current control loop to it. FIG. 16 shows a third embodiment of an electronic driver circuit that includes a peak current control loop. Both control sub-units 13, 23 have an additional input h to monitor the peak current in inductors L1 and L2. FIG. 17 shows a circuit diagram of control sub-units 13, 23. By multiplying the output of the voltage error amplifier 31 in control sub-units 13, 23 with the rectified AC mains voltage measured at terminal b, the peak current in inductors L1 and L2 as well as the energy flow in the electronic driver is regulated according to the time function of the AC mains voltage, resulting in an AC mains current with similar AC time function and high power factor.

Figure 18:
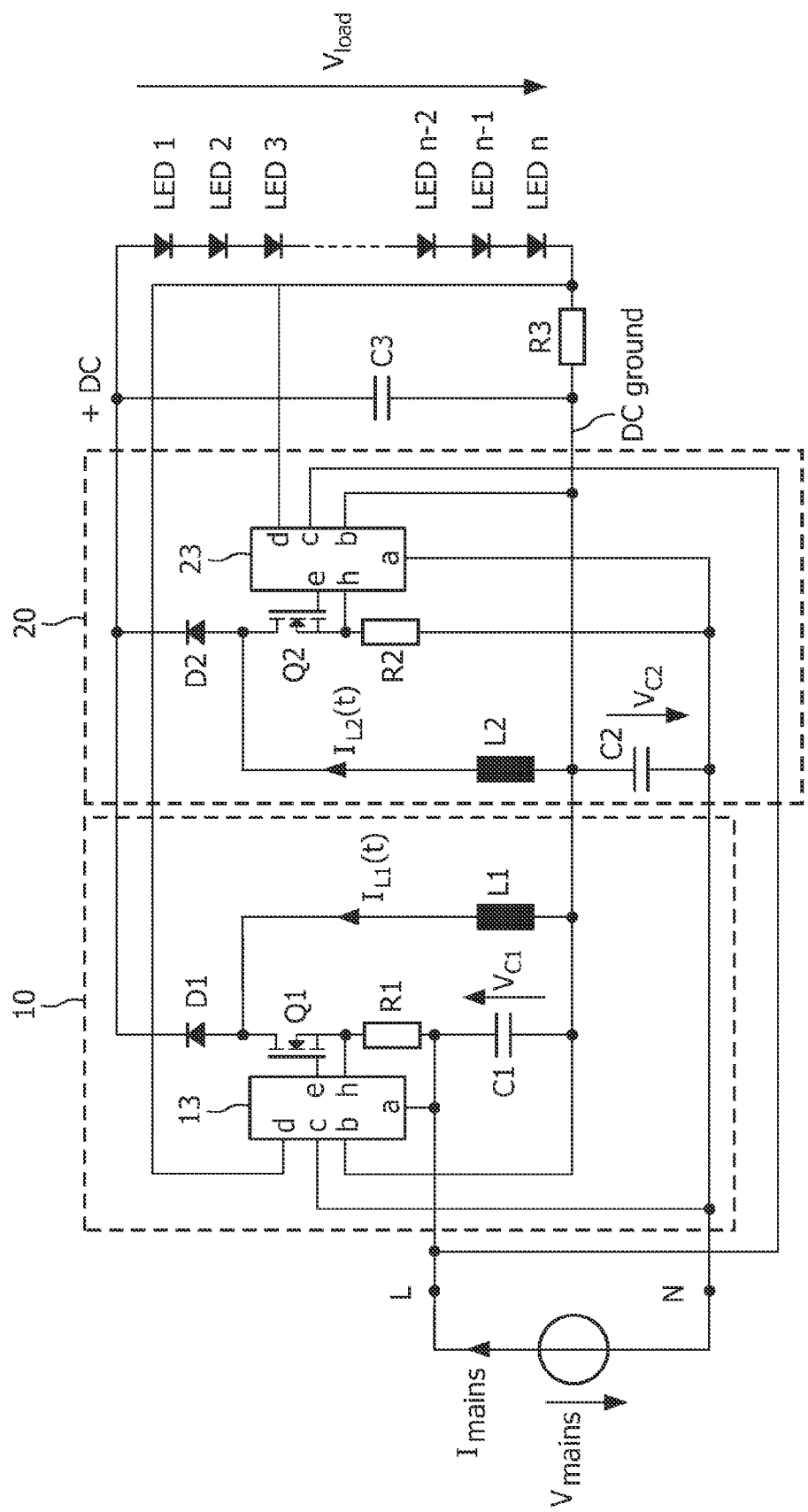
FIG. 18 shows a circuit diagram of a fourth embodiment of an electronic driver circuit according to the present invention.

The circuits depicted in FIGS. 5, 6 and 16 generate a regulated average DC output voltage $V_{load}$ that is monitored at control sub-unit terminals b and d. The control of a regulated average DC current in a load such as LED diodes can be achieved with additional measures, in particular an extended control function, as shown in a further embodiment of an electronic driver circuit shown in FIG. 18. Both control sub-units 13, 23 are monitoring the DC current in the load LEDs by means of current shunt R3 at their control inputs b and d. This signal is compared with reference signal $V_{ref.2}$ depicted in FIG. 17 and the output signal of that error amplifier is multiplied with the rectified mains voltage signal at control input b. That signal is a reference signal for the current control loop that turns-on MOSFET transistors Q1 or Q2 such that they generate always a peak current in inductors L1 or L2 that is twice the required AC mains current. That peak current is monitored by means of shunt resistors R1 and R2 at inputs h of control sub-units 13, 23. That control technique results in a high power factor of the AC mains current.

Figure 19:
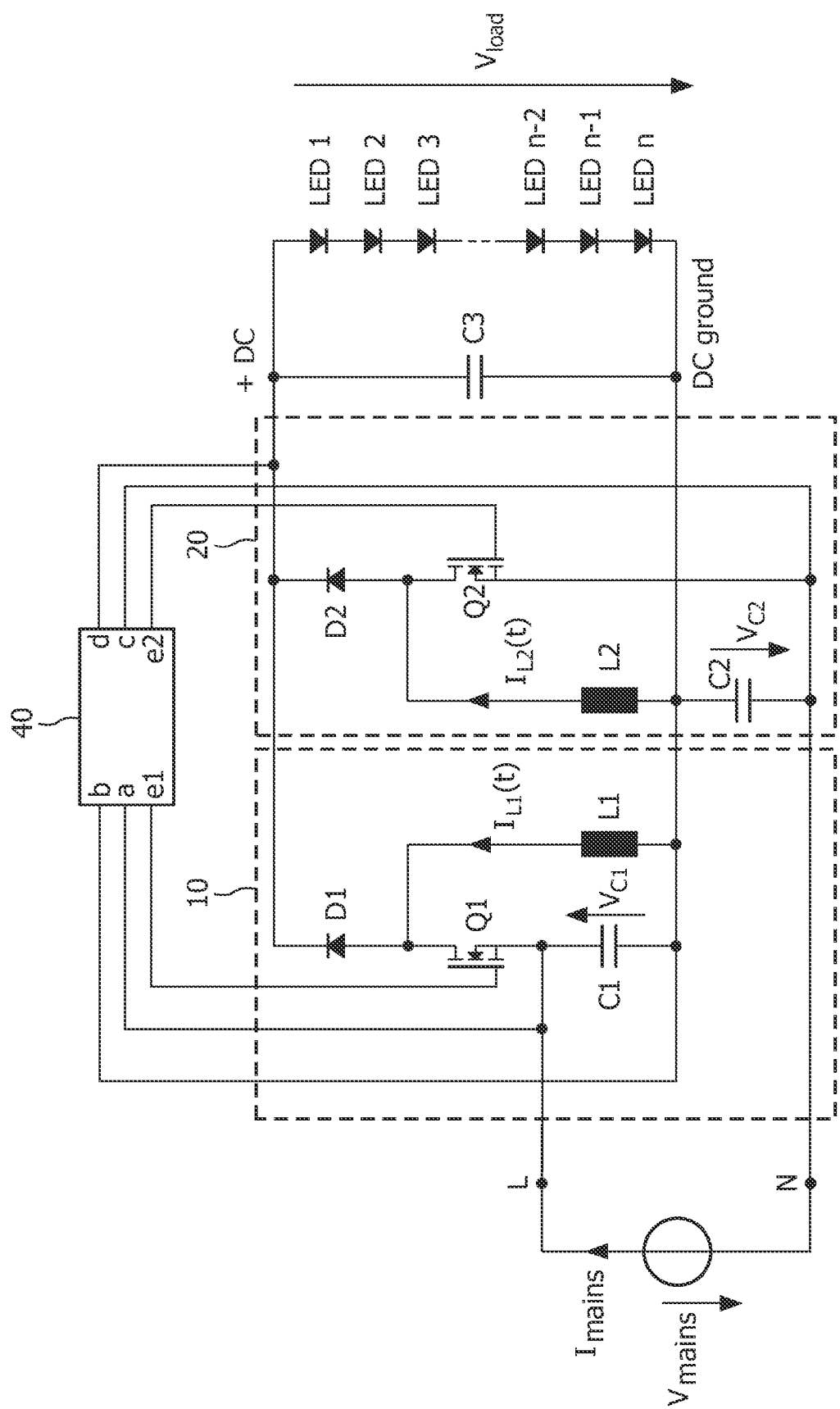
FIG. 19 shows a circuit diagram of a fifth embodiment of an electronic driver circuit according to the present invention.

FIG. 19 shows a circuit diagram of a still further embodiment of an electronic driver circuit according to the present invention. Compared to the embodiment shown in FIG. 5, only a single common control sub-unit 40 is provided for controlling both buck-boost converters 10, 20 instead of two separate control sub-units 11, 21. However, both function and control are generally identical.

The present invention proposes an electronic driver circuit and its control principle for supplying electric loads such as LEDs and OLEDs in general and special lighting applications with a regulated DC current from AC mains, which driver circuit has a low component count and a high efficiency. The circuit comprises two buck-boost converters and operates according to a dedicated dual-mode principle to realize an AC/DC and DC/DC converter in a single conversion stage. This circuit is of special interest if a lamp driver is integrated in a LED or OLED system, and its high efficiency contributes to a low thermal stress of the system.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

For instance, the particular implementation of the buck-boost converters 10, 20 or the control units and sub-units is not limited to the shown embodiments. The control units and sub-units can, for example, be implemented in software, hardware or a mixture of software and hardware. The power semiconductors Q1 to Q4 and/or the diodes D1, D2 can also be implemented with other electronic components, e.g. other transistors or electronic circuits.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

The invention claimed is:

1. An electronic driver circuit for supplying an electronic load (LED1, LED2, . . . LEDn) with a DC current or voltage ($V_{load}$), comprising:
   an AC input (L, N) for receiving an AC input voltage ($V_{mains}$),
   two buck-boost converters (10, 20) for alternately operating as rectifier for rectifying said AC input voltage ($V_{mains}$) and as DC/DC converter for DC, conversion of said rectified AC input voltage,
   a control unit (11, 12, 13, 21, 22, 23; 40) for monitoring the zero crossing of the AC input voltage ($V_{mains}$) and for controlling said two buck-boost, converters (10, 20) to change their modes of operation upon detection of a zero crossing, such that during all periods one buck-boost converter operates as rectifier and the other buck-boost converter operates as DC/DC converter.

2. The electronic driver circuit as claimed in claim 1, wherein said control unit (11, 12, 13, 21, 22, 23; 40) is adapted for monitoring the sign of said AC input voltage ($V_{mains}$).

3. The electronic driver circuit as claimed in claim 1, wherein at least one of said two buck-boost converters (10, 20) comprises a power semiconductor (Q1, Q2), in particular a MOSFET transistor, a rectifier diode (D1, D2) and a converter inductor (L1, L2).

4. The electronic driver circuit as claimed in claim 1, wherein at least one of said two buck-boost converters (10, 20) comprises a first power semiconductor (Q1, Q2), in particular a first MOSFET transistor, a second power semiconductor (Q3, Q4), in particular a second MOSFET transistor, and a converter inductor (L1, L2).

5. The electronic driver circuit as claimed in claim 1, wherein said control unit comprises a single control sub-unit (40) for monitoring the zero crossing of the AC input voltage ($V_{mains}$) and controlling the respective buck-boost converter (10, 20) to change its mode of operation upon detection of a zero crossing.

6. The electronic driver circuit as claimed in claim 1, wherein said control unit comprises two control sub-units (11, 12, 13, 21, 22, 23), each being included in one of said two buck-boost converters (10, 20) for independently monitoring the zero crossing of the AC input voltage ($V_{mains}$) and controlling the respective buck-boost converter (10, 20) to change its mode of operation upon detection of a zero crossing.

7. The electronic driver circuit as claimed in claim 1, wherein said control unit (11, 12, 13, 21, 22, 23; 40) has an internal DC reference voltage ($V_{ref.1}$) and two comparators (CO1, CO2) for turning on one power semiconductor (Q1, Q2) as a power semiconductor of a buck-boost converter with a regulated output and the second power semiconductor as a synchronous rectifier.

8. The electronic driver circuit as claimed in claim 1, further comprising a control loop for controlling the DC voltage ($V_{load}$) supplied to said load (LED1, LED2, . . . , LEDn), said control loop comprising:
   two control unit terminals for monitoring said DC voltage,
   an internal DC reference voltage ($V_{ref.2}$),
   an error amplifier for comparing said monitored DC voltage and said DC reference voltage ($V_{ref.2}$), and
   a pulse width modulator (PWM) for generating pulses and providing them to one of the two power semiconductors (Q1, Q2) for generating a regulated output voltage.

9. The electronic driver circuit as claimed in claim 1, wherein said control unit (13, 23) comprises a first control loop for controlling the DC voltage supplied to said electronic load (LED1, LED2, . . . , LEDn) and a second control loop for controlling the peak current in buck-boost inductors (L1, L2), said control loops comprising:
   two input terminals,
   a differential amplifier for measuring the voltage at the electronic load,
   a monitoring unit (R1, R2) for monitoring the peak current in said two buck-boost converters (10, 20), and
   a processing unit for comparing said monitored DC voltage with a second internal reference voltage ($V_{ref.2}$), wherein the output signal of said differential amplifier is multiplied with the rectified mains voltage signal at a control input to generate a reference signal for a current control loop that regulates the peak current in the inductors of the buck-boost converters.

10. The electronic driver circuit as claimed in claim 6, wherein said control unit (13, 23) comprises a control loop for controlling the DC current supplied to said electronic load (LED1, LED2, . . . , LEDn), plus a second control loop that controls the peak current in buck-boost inductors (L1, L2), said control loop comprising:
    a first monitoring unit (R3) for monitoring the DC current at said electronic load (LED1, LED2, . . . , LEDn),
    a second monitoring unit (R1, R2) for monitoring the peak current in said two buck-boost converters (10, 20), and
    a processing unit (13, 23) for comparing said monitored DC current with a second internal reference voltage $V_{ref.2}$, wherein the output signal of that error amplifier is multiplied with the rectified mains voltage signal at control input b to generate a reference signal for a current control loop that regulates the peak current in inductors of the buck-boost converters.

11. An electronic driving method of supplying an electronic load (LED1, LED2, . . . , LEDn) with a DC current or voltage ($V_{load}$), comprising the steps of:
    receiving an AC input voltage ($V_{mains}$),
    rectifying said AC input voltage ($V_{mains}$) by a first of two buck-boost converters (10, 20),
    DC converting said rectified AC input voltage by the second of said two buck-boost converters (10, 20),
    monitoring the zero crossing of the AC input voltage ($V_{mains}$), and
    controlling said two buck-boost converters (10, 20) to change their modes of operation upon detection of a zero crossing, such that during all periods one buck-boost converter operates as rectifier and the other buck-boost converter operates as DC/DC converter.

* * * * *